No. 790,620. PATENTED MAY 23, 1905.
A. C. CROFFORD.
INSECT TRAP.
APPLICATION FILED SEPT. 6, 1904.
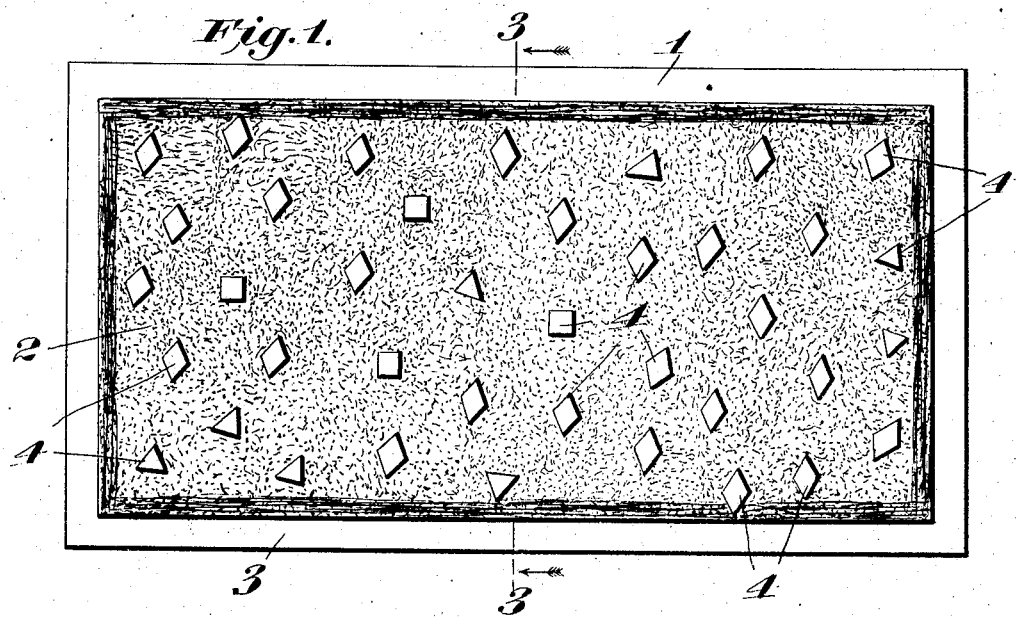
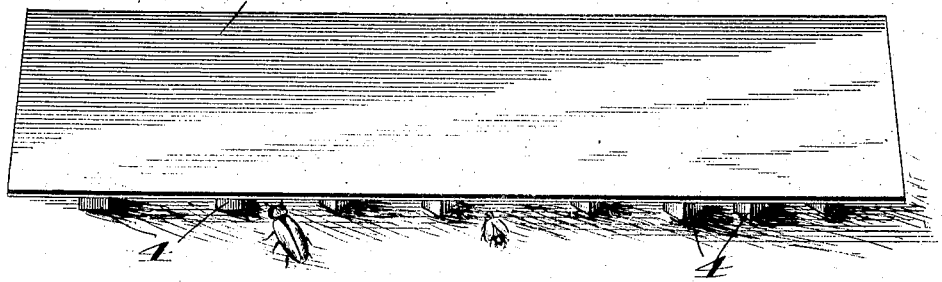
WITNESSES:
Elmer Seavey
Geo. H. Hamlin
INVENTOR
Ada C. Crofford
BY Henry N. Copp
her Attorney No. 790,620.  
Patented May 23, 1905.

UNITED STATES PATENT OFFICE.

ADA C. CROFFORD, OF NEWCASTLE, WYOMING.

INSECT-TRAP.

SPECIFICATION forming part of Letters Patent No. 790,620, dated May 23, 1905.

Application filed September 6, 1904. Serial No. 223,411.

*To all whom it may concern:*

Be it known that I, ADA C. CROFFORD, a citizen of the United States, residing at Newcastle, county of Weston, and State of Wyoming, have invented certain new and useful Improvements in Insect-Traps, of which the following is a specification.

My invention relates to insect-traps, and more especially to that class of traps which employ an adhesive or sticky surface, and is primarily adapted to trap roaches and waterbugs, but may be used to catch ants, &c.

The object of the invention is to provide a trap which will be self-set, ever set, and one which will be infallible in its action.

A further object is the novel way in which the ordinary fly-paper is utilized to make the trap.

The invention consists of a sheet of sticky fly-paper provided with projections on the sticky side, which projections are adapted to rest on the floor or table.

The invention further consists in the novel features, and combination of parts, which will be more fully disclosed hereinafter and the novelty pointed out in the appended claims.

In the drawings, Figure 1 is a bottom plan view. Fig. 2 is a perspective view showing the manner of use; and Fig. 3 is a transverse section, the disks being much magnified.

Referring more especially to the drawings, 1 represents the ordinary sheet of fly-paper, having the adhesive or sticky surface 2 and the proper margin 3.

Removably secured to the surface 2 of the sheet 1 by the sticky surface 2 are a plurality of disks or projections 4, of any suitable material—such as cardboard, wood, &c.—which are adapted to raise the surface 2 from the floor a sufficient distance to enable a roach or water-bug to get under. These projections may be made of metal or cardboard and either separate from or attached to the sheet, or they may be stamped in the sheet and be free from the adhesive substance.

In operation a sheet of thin moistened paper is smoothly pressed down upon the floor or table and water or bait placed in the middle thereof. The device shown is then placed upon the paper. This prevents the sticky surface coming in contact with the floor or table. As the bugs pass under the sticky surface to absorb or drink the moisture or eat the bait from the sheet of paper their backs engage the surface 2 and the bugs are held thereby.

What I claim, and desire to secure by Letters Patent, is—

1. An insect-trap comprising a sticky or adhesive surface provided with projections thereon, said projections adapted to support the trap.

2. An insect-trap comprising a sticky or adhesive under surface, and projections secured to said surface said projections adapted to support the sticky surface in inverted position at the proper height to allow the insect to crawl under.

3. An insect-trap comprising a sticky or adhesive surface, projections removably secured thereto, said projections adapted to sustain the sticky surface in inverted position and raise it from the support on which it rests.

In testimony whereof I hereunto affix my signature in presence of two witnesses.

ADA C. CROFFORD.

Witnesses:
W. J. McKINLEY,
G. C. GORE.